Figure 5:
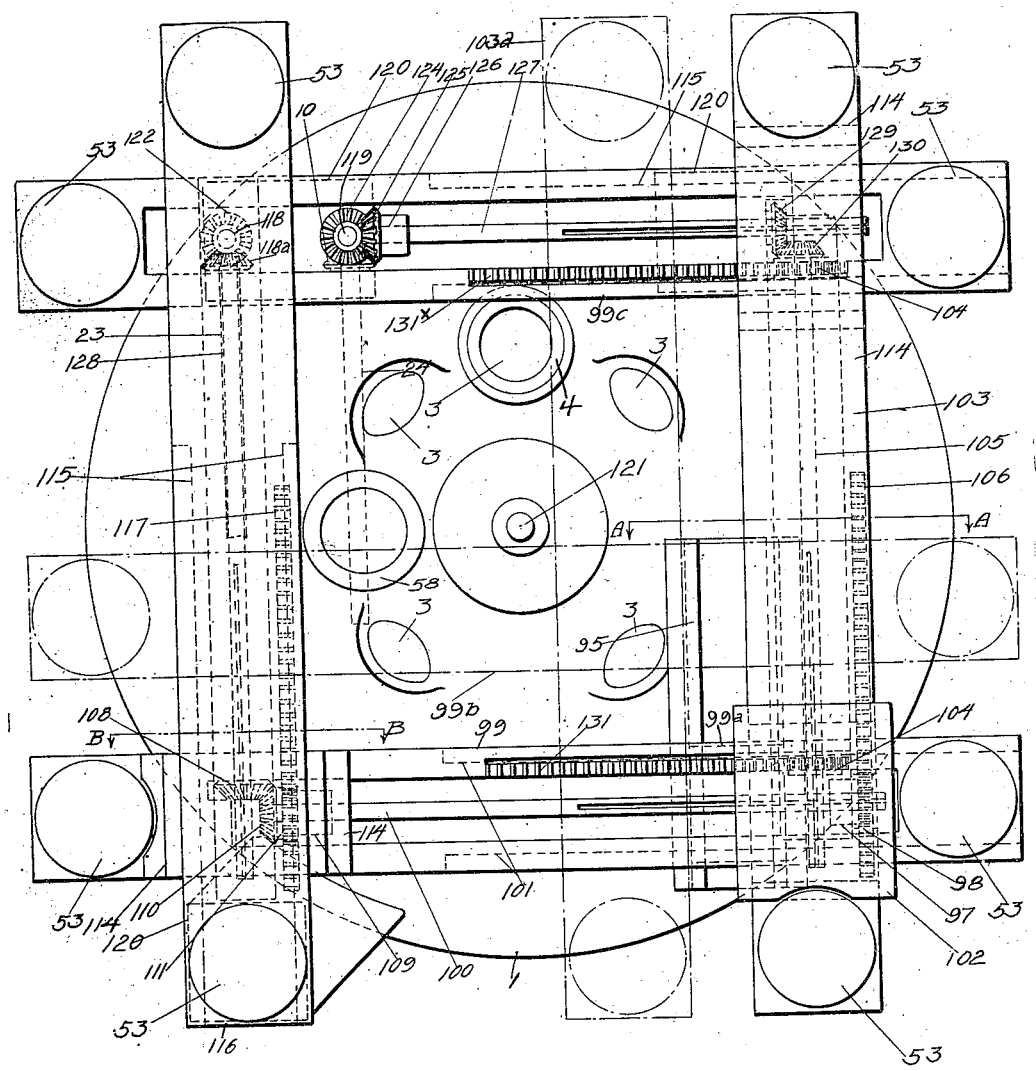

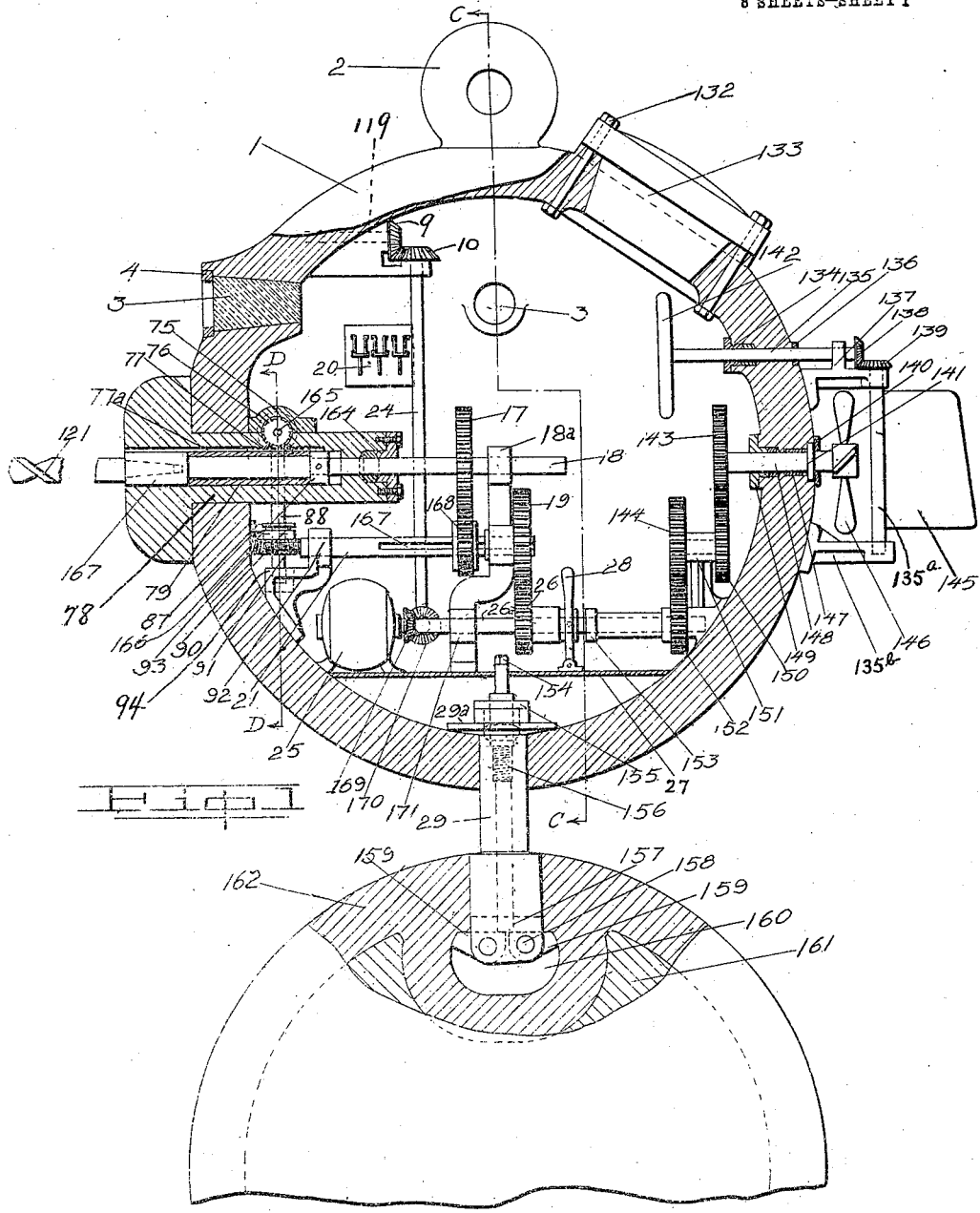

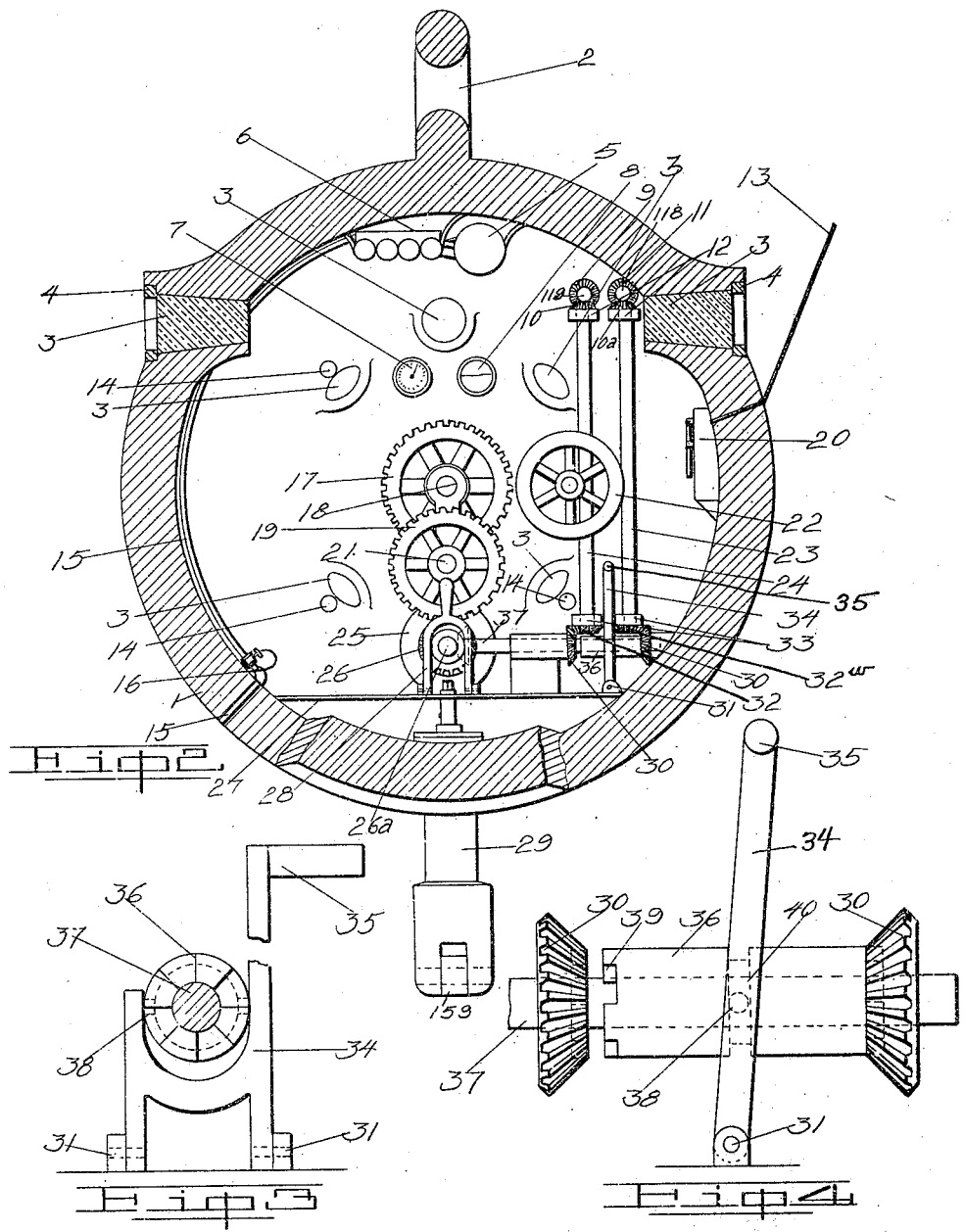

W. D. SISSON.
DIVING BELL.
APPLICATION FILED OCT. 26, 1912. RENEWED JUNE 22, 1914.

1,134,963.
Patented Apr. 6, 1915.
3 SHEETS—SHEET 3

WITNESSES:

INVENTOR
William David Sisson
BY
ATTORNEY

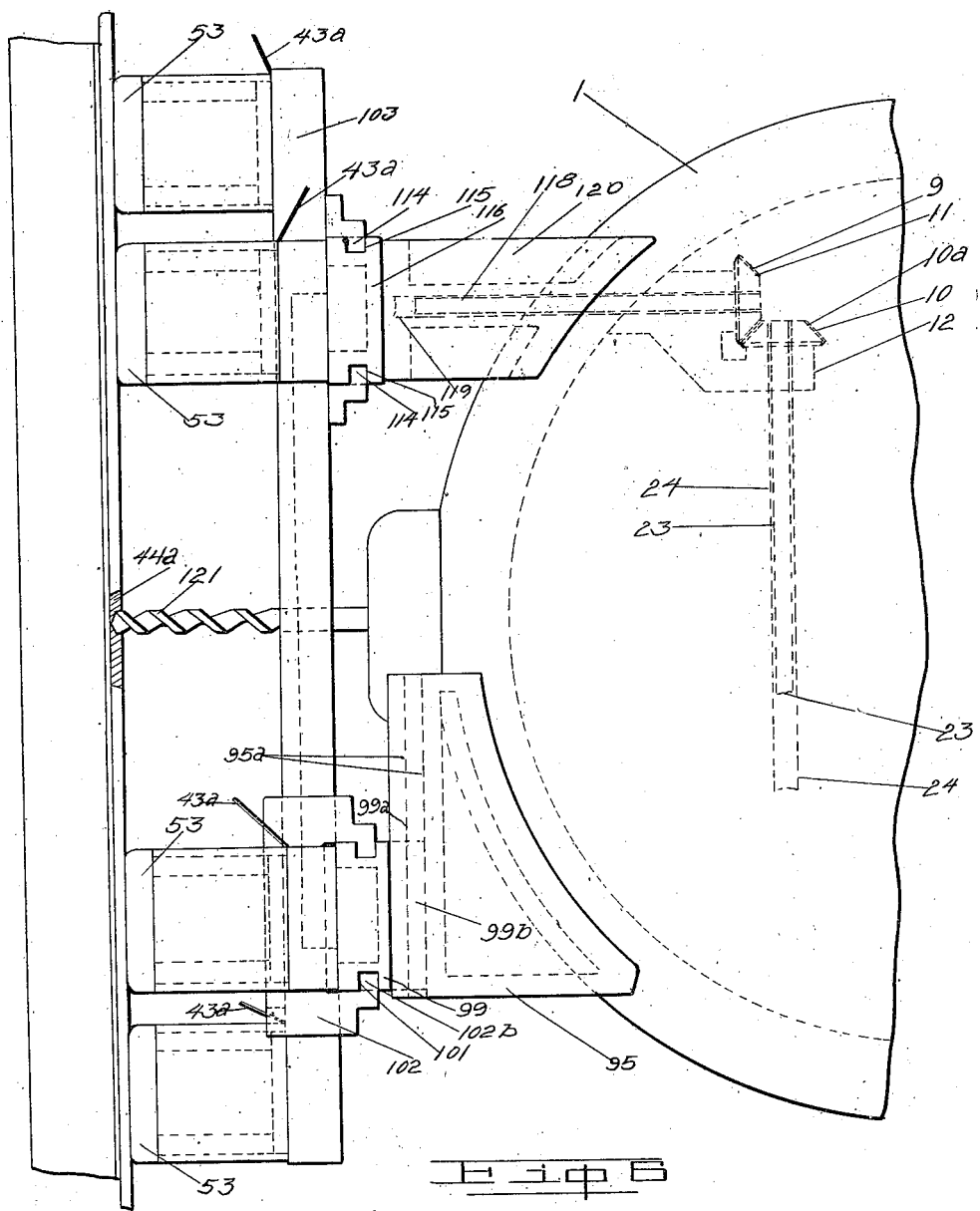

W. D. SISSON.
DIVING BELL.
APPLICATION FILED OCT. 26, 1912. RENEWED JUNE 22, 1914.
1,134,963.
Patented Apr. 6, 1915.
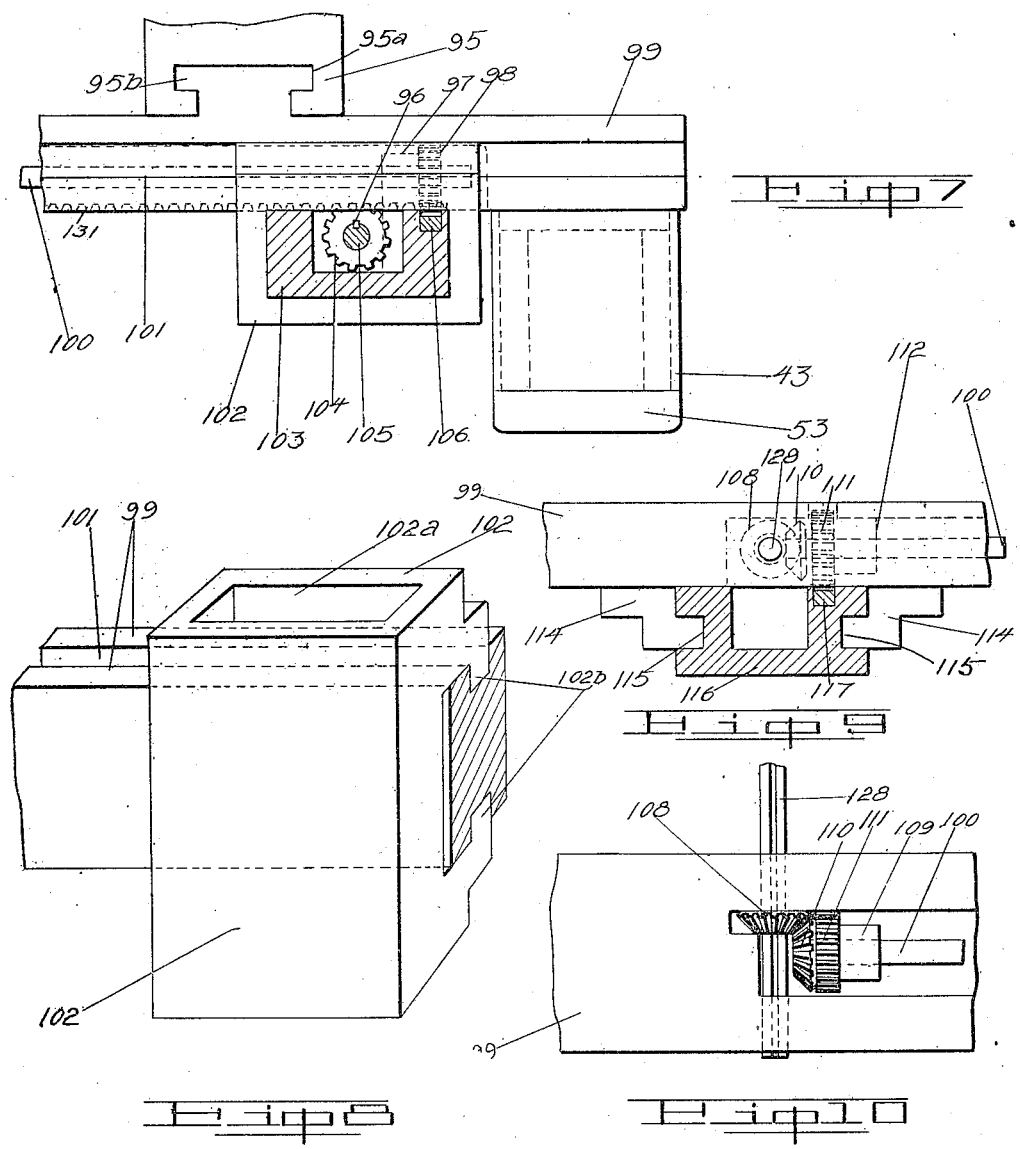

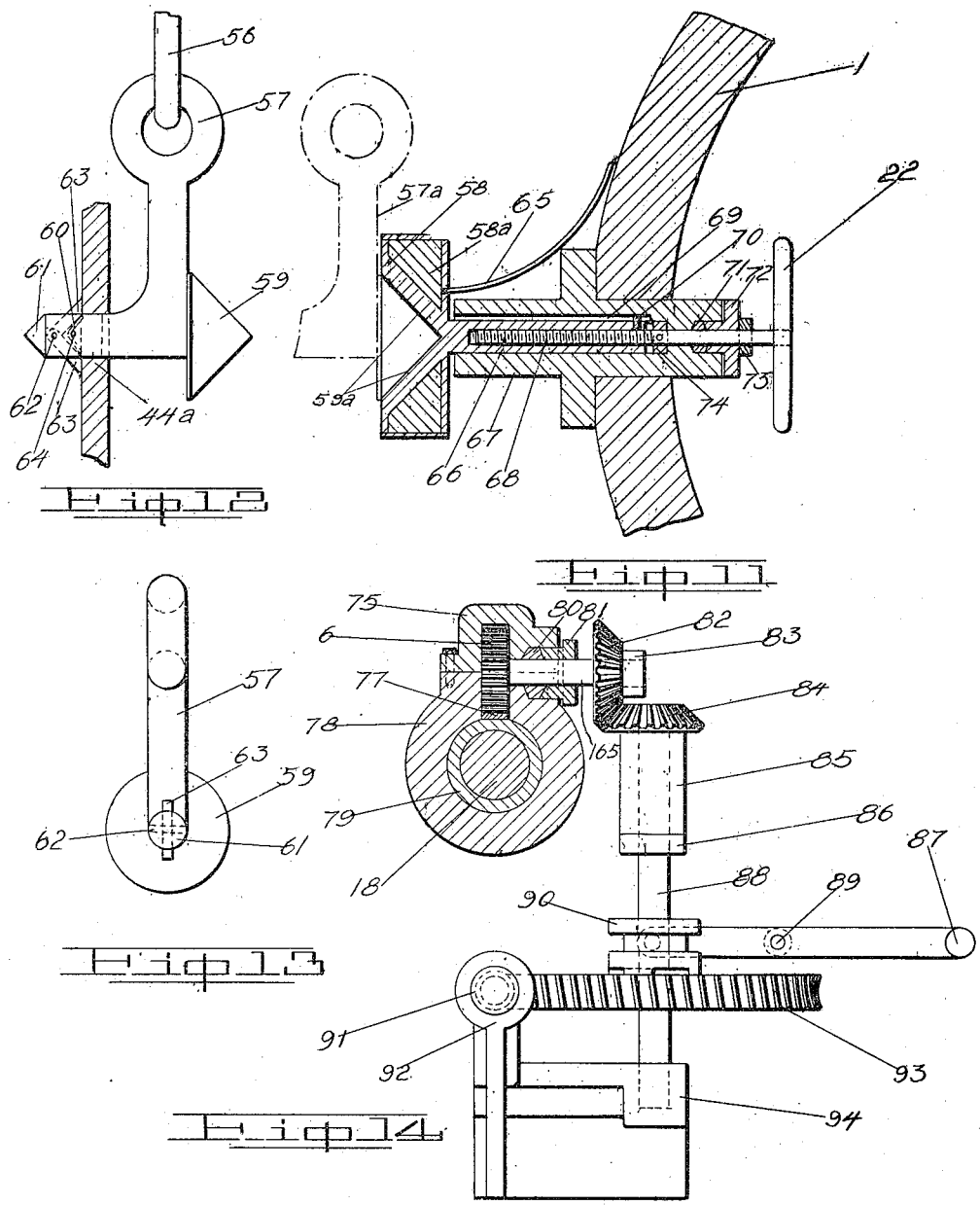

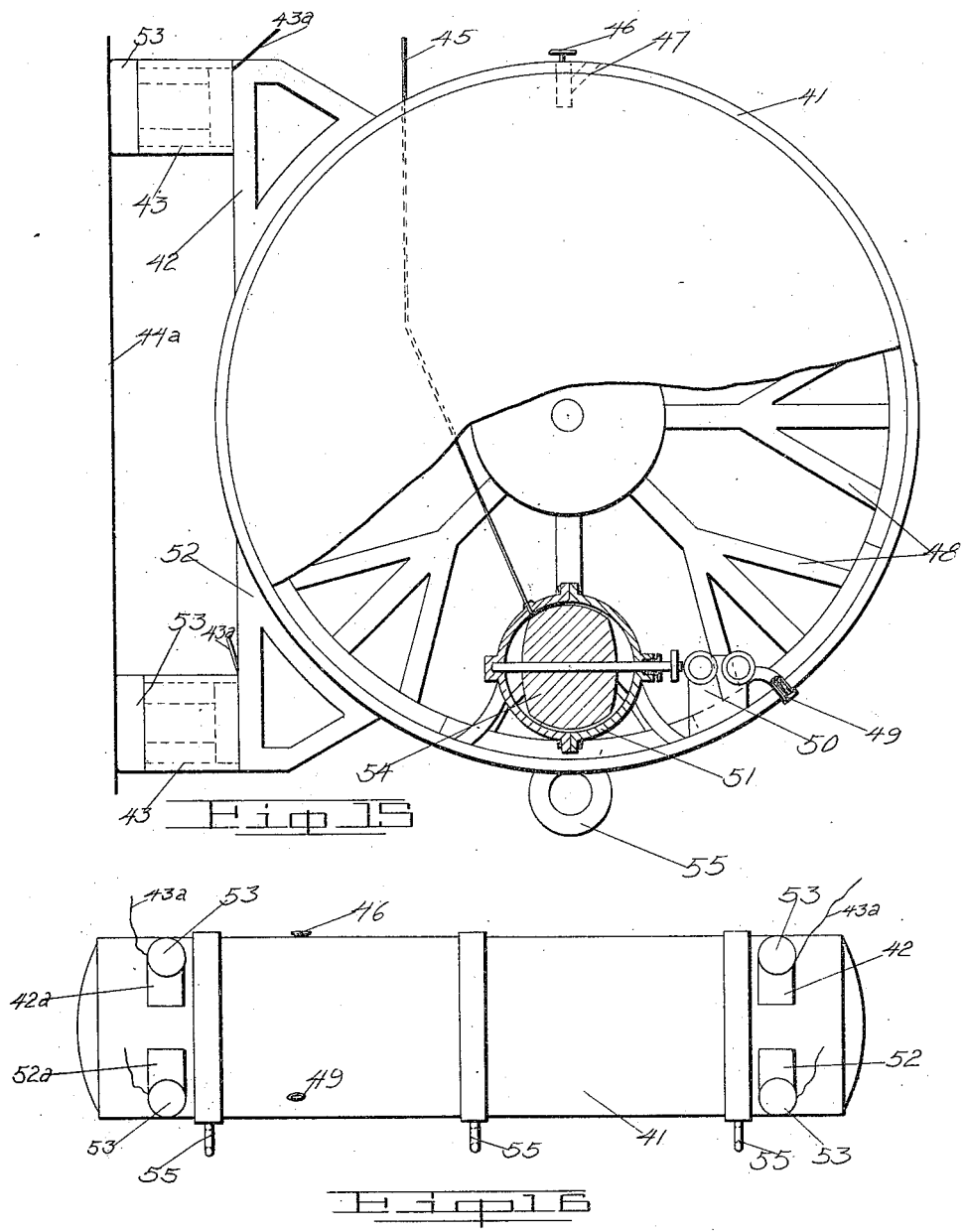

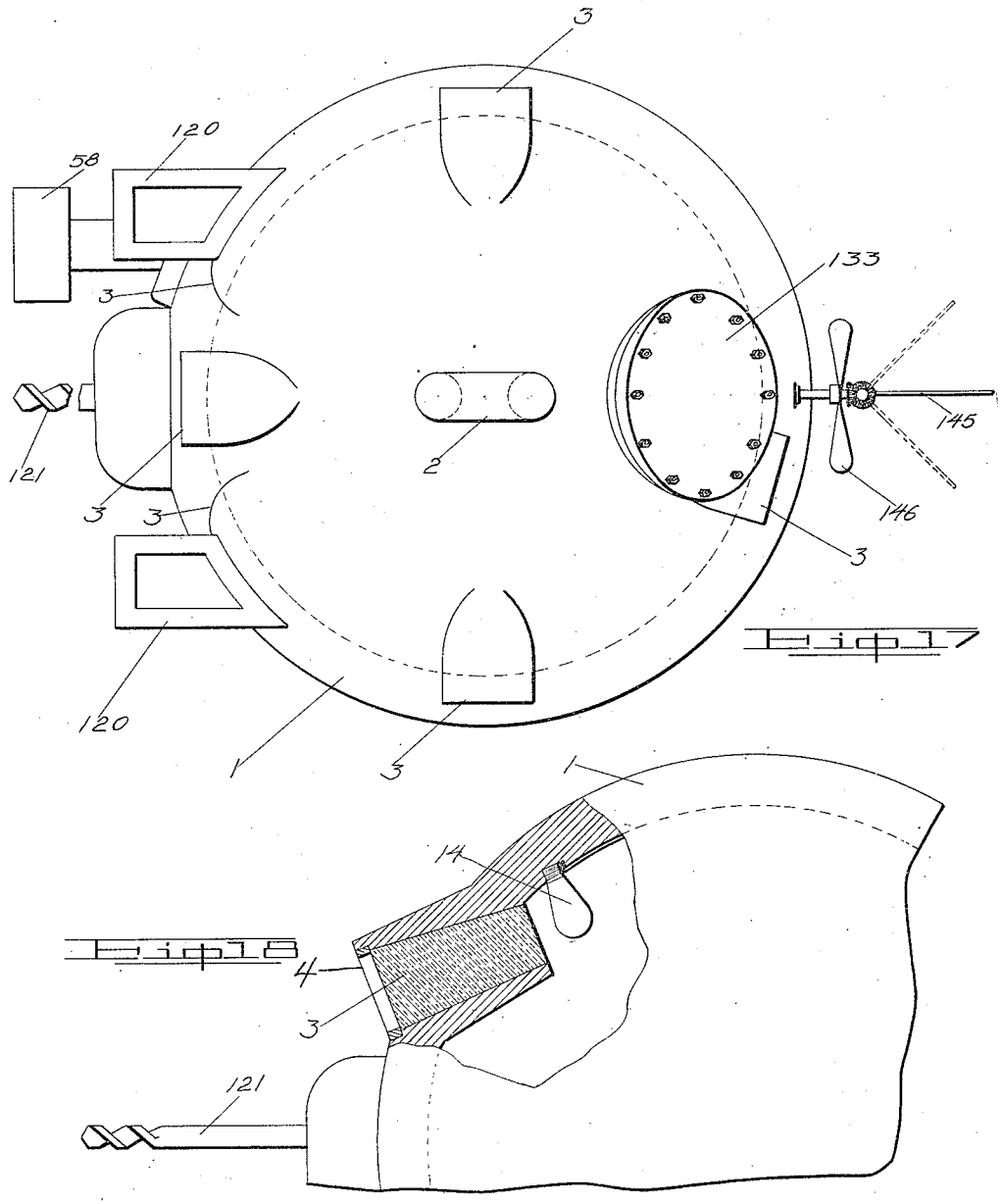

UNITED STATES PATENT OFFICE.

WILLIAM DAVID SISSON, OF LINNTON, OREGON.

DIVING-BELL.

1,134,963.  Specification of Letters Patent.  Patented Apr. 6, 1915.

Application filed October 26, 1912, Serial No. 727,936. Renewed June 22, 1914. Serial No. 846,700.

*To all whom it may concern:*

Be it known that I, WILLIAM DAVID SISSON, a citizen of the United States, residing at Linnton, in the county of Multnomah and State of Oregon, have invented certain new and useful Improvements in Diving-Bells, of which the following is a specification.

This invention relates to an improvement in diving bells and has for its object to provide a diving bell for use in deep water in raising sunken ships.

A further object is to provide such a device which may be attached to the side of a metallic vessel and held thereto by the use of magnetic force.

A still further object is to provide means for the manipulation of the device, whereby it can be moved as desired along the surface of the vessel.

A still further object is to provide a means by which the bell is employed to attach a pontoon to the side of a sunken vessel.

These and other objects are accomplished by the mechanism illustrated in the accompanying drawings, in which—

Figure 1 is a sectional side elevation, with weight attached. Fig. 2 is a sectional elevation on the line c—c of Fig. 1 looking forward. Fig. 3 is a detail end view of a clutch and shifter. Fig. 4 is a detail side elevation of same. Fig. 5 is a front elevation of the device, showing magnets and magnet beams, with means for manipulating them. Fig. 6 is a side elevation of same showing the manner of attachment and operation of the magnet beams. Fig. 7 is a section on the line A—A of Fig. 5, looking downwardly. Fig. 8 is a perspective view of a sliding member for carrying the magnet beams. Fig. 9 is a section on the line B—B of Fig. 5, looking downwardly. Fig. 10 is a fragmentary elevation showing the operating gearing. Fig. 11 is a sectional view through the anchor magnet. Fig. 12 shows an anchor hook fixed in the side of a vessel. Fig. 13 is a front elevation of an anchor hook. Fig. 14 is a sectional view on the line D—D of Fig. 1. Fig. 15 is an end view, partly in section, of a pontoon, showing an incased motor, and magnets attached. Fig. 16 is a plan view of a pontoon. Fig. 17 is a plan view of the diving bell. Fig. 18 is a detail of the lens commanding the point of the drill.

Referring to the drawings in detail, 1 designates the body of a diving bell cast in spherical form of sufficient thickness to resist the pressure of deep water, and of dimensions to accommodate one or more operators, with their equipment.

2 is an eye to which a cable may be attached for raising and lowering the bell.

3 are observation lenses suitably incased in the packing 4 in ports in the bell casing, disposed at 90 degrees apart. Within the casing at the upper side is fixed a motor 5, to which is connected air pump 6 for the purpose of expelling the foul air through the tube 15, Fig. 2, in which is arranged a controlling valve 16.

7 is an air pressure gage to denote the pressure of air within the bell.

8 is a compass.

9 is a bevel gear fixed upon the shaft 119, and meshing with it is a gear 10 on the upper end of shaft 24 which carries upon its lower end a similar gear 32 meshing with gear 30, loosely mounted on shaft 37.

11 is a bevel gear fixed adjacent gear 9, on the shaft 118, and it meshes with gear 10$^a$ fixed at the end of shaft 23 which carries at its lower end a gear 32$^w$ meshing with another gear 30, which also is loosely mounted on shaft 37. A bearing 12 is provided on each of the shafts 23 and 24 to support its corresponding gear 10$^a$ and 10; and a similar bearing 33 supports each gear 32. The gears 30 are arranged to face each other and between them is a clutch 36 movable into engagement with either gear, by means of lever 34 pivoted upon the floor at 31, and having a handle 35.

13 designates electric wires carrying electricity for power, light and telephone service, Fig. 2.

14, Fig. 18, represents electric lights, one being arranged opposite each lens 3, to direct the light upon the objective point.

17 designates a spur gear fixed upon spindle 18, supported in bearing 18$^a$, which gear is driven by shrouded pinion 168, which is slidably secured on the feather 167 on the shaft 21 so as to turn with said shaft. Upon said shaft 21 is fixed a gear 19, which is driven by pinion 26 which is fixed upon the drive shaft 26$^a$ which in turn is driven by a motor 25.

20 is a switch board fixed at a convenient point on the lateral wall, to which the wires 13 lead.

22 is a hand wheel (see Fig. 11) carried by screw 68, which is threaded in the stem 66 of the magnet core 58, carrying the coil 58ª, which is connected by means of electric cable 65 with the switch board 20, 27 represents a flooring in the lower portion of the spherical bell.

28, Fig. 1, is a lever for shifting clutch 153, on the drive shaft 26ª, into and out of engagement with pinion 152 meshing with gear 144, fixed upon shaft 151 carrying pinion 150 meshing with gear 143 carried upon shaft 148 operating in bearing 147 in the shell of the bell, which is protected by thrust collars 140 and 141. Upon the terminal of the shaft is fixed the propeller 146.

29 is a tube secured in an aperture in the bottom of the shell by means of flange 29ª, in the upper end of which is a packing gland 155, within which operates the shaft of screw 156. The upper end 154 of the shaft is adapted to be turned by a wrench to drive the screw 156 upon the spindle 157 which bears upon the inner ends of pawls 159 pivoted upon pins 158, thereby firmly securing them against the upper face of cavity 160, of the shell 162, carrying the weight 161. When it is desired to quickly raise the bell it may be done by turning the screw up allowing the spindle to rise, permitting the pawls to be turned upon their pivots, thereby allowing the weight to be released from the bell. At an intermediate point in clutch 36, (Fig. 4) is a groove carrying a collar 40 on which are trunnions 38 engaging the shifting lever 34, by means of which the terminals 39 are placed in engagement with gears 30.

41 is a pontoon (Figs. 15 and 16) or cylindrical vessel, made preferably of boiler plate, and carrying adjacent one end, brackets 42 and 52 and at the other end similar brackets 42ª and 52ª, to each of which is attached a magnet 53. 43 is a casing inclosing each of said magnets protecting them from the action of the water.

44ª indicates the side of a vessel to which the pontoon may be attached by the magnetic force.

43ª are electric cables leading to the generator on the tender ship on the surface. 45 is a similar cable leading from the generator through the shell 41 to the motor 54, the purpose of which is to operate the pump 50 to discharge the water carried in the pontoon through discharge valve 49.

46 is a valve which may be opened to admit water through aperture 47 for the purpose of sinking the pontoon.

48 are stay braces for sustaining the casing.

51 is a spherical casing inclosing the motor 54. The casing is provided with suitable packing glands about the shaft leading from the motor to the pump 50.

55 are eyes secured to the lower side of the pontoon to which are attached chains 56, each carrying at its lower end an anchor hook 57. (See Fig. 12.) Formed upon the body of the hook is a conical male section 59 adapted to fit in the correspondingly formed opening 59ª in the core 58. The terminal of the anchor is pointed at 61 to adapt it to enter an aperture in the hull 44ª of a vessel. At a suitable point within the point 61 is fixed a pin 62 carrying latches 63 which are adapted to swing inwardly on said pin, in a longitudinal aperture in the hook. Between the free ends of said latches is fixed another pin 64 carrying a spring 60 which bears upon the latches pressing them outwardly. It allows the hook to be inserted in the aperture and when the latches clear the hull they will be forced outwardly to engage the inner face of the wall of said hull, and thus prevent the hook from becoming disengaged.

67 is a tubular casing supporting the stem 66 and it is secured to the bell extending through an aperture to the interior. A key way 69 in the tube receives the key 70 on the stem 66 preventing rotation of the latter.

71 is a packing about the stem of the screw 68, held in place by the gland 72.

73 and 74 are fixed collars to prevent relative longitudinal movement of the screw.

75 is a casing which incloses the gear 76 mounted on shaft 165 which carries at its outer end bevel gear 82, which is held thereon by collar 83.

77 is a rack fixed upon sleeve 79 which is caused by gear 76 to move longitudinally with reference to the casing, in groove 77ª, but which is fixed, with reference to spindle 18, by means of collar 166.

78 is a casing inclosing said sleeve and securing same in an aperture in the shell.

80 is a packing about the shaft 165 and it is held in place by the gland 81. (See Figs. 1 and 14.)

84, Fig. 11, is a bevel gear meshing with gear 82 and fixed upon vertical shaft 88 supported in bearing 85 and held in place by collar 86.

87 is a lever pivoted at 89 which engages clutch 90 which is adapted to slide upon shaft 88 into and out of engagement with worm gear 93, which is loosely mounted on said shaft bearing in the base 94.

91 is a worm meshing with and operating the gear 93 and it is mounted in the bearing 92.

95, (see Figs. 6 and 7) is a heavy vertical bracket fixed to one side of the shell near the lower portion of the shell. It is provided with an internal T-groove 95ª to slidably receive the T 95ᵇ projecting from the horizontal beam 99.

102 is a boxing provided with a vertical rectangular opening 102ª to receive the vertical beam 103. Transversely in this block is formed a T-groove leaving at each side a tongue 102ᵇ adapted to be received by the correspondingly formed groove 101 of the beam 99. Upon the rear side of this beam is formed the vertical T-projection 95ᵇ, bearing in the bracket 95.

In the open space between the lateral members of the beam 103 is mounted the shaft 105 having the feather 96 upon which is slidably secured a pinion 104, which meshes with rack 131 fixed upon the horizontal beam 99, (see Fig. 5).

97 and 109, Figs. 7 and 10, are bearings in the channel of the lower beam 99 which carry the shaft 100. 98 is a gear fixed upon said shaft and meshes with vertical rack 106, fixed upon beam 103. Toward the opposite end of shaft 100 is fixed a pinion 111, (see Figs. 5 and 9) meshing with rack 117 fixed upon beam 116, and at the end of said shaft is fixed a bevel gear 110 which engages pinion 108 which is slidably secured upon the shaft 128 having a feather and key ways, mounted in suitable bearings in the channel of beam 116, which is rigidly fixed upon brackets 120. At the upper end of shaft 128 is fixed a bevel gear 118ᵃ meshing with gear 122 fixed upon shaft 118, which extends into the shell and carries upon its inner end the gear 11 meshing with gear 10ᵃ carried on the upper end of shaft 23, which connects with the drive shaft 37, as above described.

114, (see Fig. 9) are lugs cast on the front face of beam 99 so as to form a T-slideway to receive the beam 116 having the lateral grooves, 115 in which the tongues of lugs 114 bear. Adjacent the shaft 118 is mounted in the same beam the parallel shaft 119 extending through the shell into the bell. On its outer extremity is fixed bevel gear 124 meshing with gear 125 carried at the end of shaft 127 supported in bearing 126 within the channel of beam 99ᶜ. At the opposite end of shaft 127 is carried bevel gear 129 which is slidably connected thereto by means of a feather and which meshes with bevel gear 130 at the upper end of shaft 105. Contiguous to gear 130 is fixed pinion 104, on said shaft, which engages rack 131ˣ which is fixed on the stationary beam 99ᶜ. At each side, toward the top, of the bell is fixed a bracket 120 to which the upper beam 99ᶜ is rigidly secured. At the lower left side, when looking toward the front of the machine is fixed another bracket 120, to which the lower end of beam 116 is rigidly fixed, the upper end being fixed to beam 99ᶜ. The vertical beam 116 and bracket 95 act as guides for the vertically movable beam 99, and beams 99 and 99ᶜ act as guides for the horizontally movable beam 103, beams 99 and 103 both being slidably mounted in the block 102. Beams 99ᶜ and 103 are slidably connected by a tongue and groove arrangement, the same as beams 99 and 116, shown in Fig. 9.

121 is a drill held in the socket 167 of the drill spindle 18.

132 are bolts which secure the closure plug 70 133.

142 is a steering wheel fixed upon shaft 135, bearing in the gland 134 in the casing which is provided at the outer side with a thrust bearing 136.

137 is a bracket sustaining shaft 135 and the vertical shaft 135ᵃ which carry the intermeshing gears 138 and 139 respectively. The shaft 135ᵃ bears at its lower end in a bracket 135ᵇ and carries the rudder 145, which is operated by the steering wheel 142.

The device will be suitably equipped with air hose and tanks for containing liquid oxygen and all usual equipment needed in submarine vessels.

The primary purpose of the machine is to locate sunken vessels, which may be done by moving within the radius permitted by the limit suspending it from the vessel above. It is then intended to attach pontoons to the vessel, to raise it in the following manner: The pontoon will have been lowered by being attached to the magnets of the bell, to a suitable point at the side of the ship, and upon a signal the tender ship will switch the current upon the pontoon and attach it to the hull by means of its magnets 53, as seen in Fig. 15. The diving bell will then be detached by switching the currents from its magnets, and moved to a suitable point below the pontoon within range of the anchor hooks 57 which will be suspended at proper intervals therefrom with the conical section 59 standing always toward the cores 58. The bell will then be attached to the vessel by the force of its magnets, and a hole will be drilled in the hull by means of drill 121 operated by the motor 25. The hook 57 will be attached to the magnet core 58, which extends from a point adjacent the drill, by moving the core opposite the cone 59. The bell will then be moved either vertically or horizontally until the point 61 of the hook stands opposite the drill hole. The hook will then be inserted by means of the screw 68 operated by the hand wheel 22.

The movements of the bell are accomplished as follows: If it is desired to move the bell to the right, as seen in Fig. 5, the current will be switched from all the magnets except those on beam 103. The clutch 36 will be placed in engagement with shaft 24, which drives shaft 119, which in turn drives shaft 127, causing shaft 105 to revolve upon which are fixed pinions 104, which engage the racks 131, thereby causing the bell to move to the right, and the beam 103 to assume the approximate relative position shown by the dotted lines 103ᵃ.

To move the bell to the left, it will be necessary only to reverse the current in the motor, and thereby operate the shaft 105 in the opposite direction. To move the bell upward, the magnets on the beam 99 will be released. The clutch 36 will then be engaged with shaft 23, which connects with shaft 118, which in turn drives shaft 128, causing shaft 100, carrying pinions 98 and 111, to revolve, thereby causing beam 99 to travel upward on the racks 106 and 117, as indicated at 99$^b$. The current will then be turned on the magnets of the beam 99 fixing it to the hull. The current will then be released from the magnets on the other beams. Then by reversing the current in the motor, the shaft 100 will be rotated in the opposite direction causing the bell to rise. In this manner the bell may be quickly moved in any desired direction about the hull for the purpose of applying the drill or for engaging and inserting the anchor hooks.

What I claim as new and desire to secure by Letters Patent, is—

1. A submarine vessel comprising a spherical shell having a man hole therein, a water tight door fitted in the man hole, observation lenses fixed in the wall of the shell, a tubular stem depending from the shell, pawls pivoted to the lower end thereof adapted to engage an external body and means within the shell for releasing the pawls.

2. A submarine vessel comprising a shell, equipped with an electric system, slidable supports carried upon one side thereof, electromagnets fixed upon said supports for attaching the vessel to a metallic object, and means for operating said supports for changing the position of said vessel.

3. A submarine vessel comprising a shell equipped with an electric system, supporting beams arranged in the same plane upon one side of the shell, electromagnets fixed upon said beams for attaching the shell to a metallic object, means for independently energizing said magnets and means for manipulating the beams carrying the magnets for changing the position of the shell upon said object.

4. A submarine vessel comprising a shell equipped with an electric system, means for preserving it upright, a horizontal beam fixed upon the shell, a vertical beam fixed to the shell and to the horizontal beam, a horizontal and a vertical beam slidably secured to each other and to the first mentioned beams, magnets fixed upon each of said beams, and means for changing the relative positions of the slidable beams.

5. A submarine vessel comprising a shell equipped with an electric system, means for preserving it upright, a horizontal beam fixed upon the shell, a vertical beam fixed to the shell and to the horizontal beam, a horizontal and a vertical beam slidably secured to each other and to the first mentioned beams, magnets fixed upon each of said beams, means for independently energizing the magnets of each beam, and means for independently changing the relative positions of the slidable beams.

6. A submarine vessel comprising a shell equipped with an electric system, means for preserving it upright, a horizontal beam fixed upon the shell, a vertical beam fixed to the shell and to the horizontal beam, a horizontal and vertical beam slidably secured to each other and to the first mentioned beams, magnets fixed upon each of said beams, means for independently energizing the magnets of the different beams, and means for independently changing the relative positions of the slidable beams, whereby the shell may be caused to move in a vertical or horizontal direction.

In testimony whereof I affix my signature in presence of two witnesses.

WILLIAM DAVID SISSON.

Witnesses:
E. E. HECKBERT,
HAZEL A. ARMSTRONG.